(12) United States Patent
Jung (10) Patent No.: US 11,915,159 B1
(45) Date of Patent: Feb. 27, 2024

(54) PARALLELIZED AND DISTRIBUTED BAYESIAN REGRESSION ANALYSIS

(71) Applicant: Pivotal Software, Inc., San Francisco, CA (US)

(72) Inventor: Woo Jae Jung, Menlo Park, CA (US)

(73) Assignee: Pivotal Software, Inc., San Francisco, CA (US)

(*) Notice: Subject to any disclaimer, the term of this patent is extended or adjusted under 35 U.S.C. 154(b) by 875 days.

(21) Appl. No.: 15/583,493

(22) Filed: May 1, 2017

(51) Int. Cl.
  *G06N 7/01* (2023.01)
  *G06F 16/248* (2019.01)
  *G06F 16/28* (2019.01)
  *G06F 16/2458* (2019.01)

(52) U.S. Cl.
  CPC ............. *G06N 7/01* (2023.01); *G06F 16/248* (2019.01); *G06F 16/2462* (2019.01); *G06F 16/285* (2019.01)

(58) Field of Classification Search
  CPC ... G06N 7/005; G06F 16/2462; G06F 16/285; G06F 16/248
  See application file for complete search history.

(56) References Cited

U.S. PATENT DOCUMENTS

| | | | |
|---|---|---|---|
| 7,890,451 B2* | 2/2011 | Cancel | G06F 16/958 707/607 |
| 8,725,569 B2* | 5/2014 | Liang | G06Q 30/0255 705/14.66 |
| 9,852,606 B1* | 12/2017 | Heier | G06Q 50/265 |
| 10,552,746 B2* | 2/2020 | Dong | G06N 5/04 |
| 2003/0176931 A1* | 9/2003 | Pednault | G06K 9/6282 700/31 |
| 2013/0345957 A1* | 12/2013 | Yang | G06N 5/02 701/300 |
| 2013/0346033 A1* | 12/2013 | Wang | G06F 17/10 703/2 |

(Continued)

OTHER PUBLICATIONS

Shuang Wang, Jun. 2013, "Expectation Propagation LOgistic REgRession (EXPLORER): Distributed privacy-preserving online model learning", Elsevier (Year: 2013).*
Mahani et al. ("SIMD parallel MCMC sampling with applications for big-data Bayesian analytics", Computational Statistics & Data Analysis vol. 88, Aug. 2015, pp. 75-99) (Year: 2015).*
Xu et al. ("Distributed Bayesian Posterior Sampling via Moment Sharing", 2014 NIPS) (Year: 2014).*

(Continued)

*Primary Examiner* — Michael J Huntley
*Assistant Examiner* — Imad Kassim
(74) *Attorney, Agent, or Firm* — King Intellectual Asset Management (57) ABSTRACT

Systems, methods, and computer program products for estimating a Bayesian hierarchical regression model using parallelized and distributed Gibbs sampling are described. The techniques can be implemented to solve use cases where there is a response variable, e.g., number of store visits or web page visits, which is a variable of interest, and multiple explanatory variables, e.g., locations, temperatures, or prices, that may predict the response variable. The disclosed techniques build a model that explains and quantifies effects of the explanatory variables on the response variable on a distributed system. For instance, the disclosed techniques can build a model which has the capability to estimate that an X-degree increase in temperature at a certain time of year predicts a Y-percent increase in store visits. This estimation process is performed in parallel on multiple nodes of the distributed system.

18 Claims, 3 Drawing Sheets

(56) References Cited

U.S. PATENT DOCUMENTS

| | | | | |
|---|---|---|---|---|
| 2014/0095258 | A1* | 4/2014 | Weiss | G06Q 30/0211 705/7.32 |
| 2014/0200955 | A1* | 7/2014 | Whiteman | G06Q 30/0206 705/7.29 |
| 2015/0112891 | A1* | 4/2015 | Watanabe | G06N 20/00 706/1 |
| 2015/0128150 | A1* | 5/2015 | Ueda | G06F 9/5088 718/105 |
| 2016/0300252 | A1* | 10/2016 | Frank | G06Q 30/0203 |
| 2017/0076322 | A1* | 3/2017 | Sparrow | G06Q 30/0241 |
| 2017/0220713 | A1* | 8/2017 | Joshi | G06F 17/18 |
| 2018/0060885 | A1* | 3/2018 | Elmachtoub | G06Q 30/0204 |
| 2018/0284735 | A1* | 10/2018 | Cella | G05B 19/41875 |

OTHER PUBLICATIONS

Xun et al. ("PBODL : Parallel Bayesian Online Deep Learning for Click-Through Rate Prediction in Tencent Advertising System", NIPS, 2017) (Year: 2017).*

Neiswanger et al., "Asymptotically Exact, Embarassingly Parallel MCMC", Machine Learning Department, Carnegie Mellon University, Mar. 2014, 16 pages.

Scott et al., "Bayes and Big Data: The Consensus Monte Carlo Algorithm", 2013, retrieved online at http://www.rob-mcculloch.org/some_papers_and_talks/papers/working/consensus-mc.pdf), 22 pages.

Koop, Gary, "Web Materials for Bayesian Econometrics by Gary Koop", published by John Wiley, 2003, retrieved on at http://www.wiley.com/legacy/wileychi/koopbayesian/, 8 pages.

* cited by examiner

PARALLELIZED AND DISTRIBUTED BAYESIAN REGRESSION ANALYSIS

BACKGROUND

This disclosure generally relates to data analysis in a parallelized, distributed computing environment.

Gibbs sampling provides capabilities for estimating Bayesian hierarchical regression models. Conventional tools for Gibbs sampling (e.g., WinBUGS® or OpenBUGS®) are limited to execution on standalone computers. These tools do not fully exploit computing capabilities of distributed, parallelized computing platforms. Some modern approaches, e.g., a consensus Monte Carlo algorithm, do aim to exploit the computing capabilities of distributed, parallelized computing platforms. By design, these approaches typically make heavy use of approximation methods.

SUMMARY

This specification describes techniques of estimating a Bayesian hierarchical regression model using parallelized and distributed Gibbs sampling. The disclosed techniques can be implemented to solve use cases where there is a response variable, e.g., number of store visits or web page visits, which is a variable of interest, and multiple explanatory variables, e.g., locations, temperatures, or prices, that may predict the response variable. The disclosed techniques include building a model that explains and quantifies effects of the explanatory variables on the response variable on a distributed system. For instance, the disclosed techniques include building a model that has the capability to estimate that an X-degree increase in temperature at a certain time of year predicts a Y-percent increase in store visits. The estimation would be performed in parallel on multiple nodes of the distributed system.

The subject matter described in this specification can be implemented in various embodiments so as to realize one or more of the following advantages. For example, to analyze data, e.g., sales data, across a large geographic area, e.g., the 50 states of the United States, conventional techniques may include building a respective model for each state. Each model may be separate from other models in that each model uses its own data but not data from other models. Alternatively, conventional techniques may include building a single national model for all 50 states. This model may be referred to as a "pooled" model where a single, identical model would be used to explain sales for all 50 states. The data from all states will be shared and used together to build this single model. This conventional model will not allow variation between different states.

The disclosed techniques improve upon the above-described conventional techniques. The disclosed techniques include building a model that lies between the two conventional approaches. The disclosed techniques allow 50 different models, differentiated by state, to be processed in parallel, where each state's model is pulled toward a national model. In addition to influencing a given state's model using the state's model's own data, the disclosed techniques allow other states' data to partially influence the state's model, in essence allowing the state's model to borrow strength from other states. Accordingly, the disclosed techniques can improve upon conventional statistical analysis techniques by accounting for the variation by state and making use of all available data. In addition, from a performance and speed perspective, the disclosed techniques improve upon commonly used existing tools for Gibbs sampling by exploiting the capabilities of parallelized, distributed computing platforms such as Pivotal Greenplum Database (GPDB®) and Apache HAWQ®.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
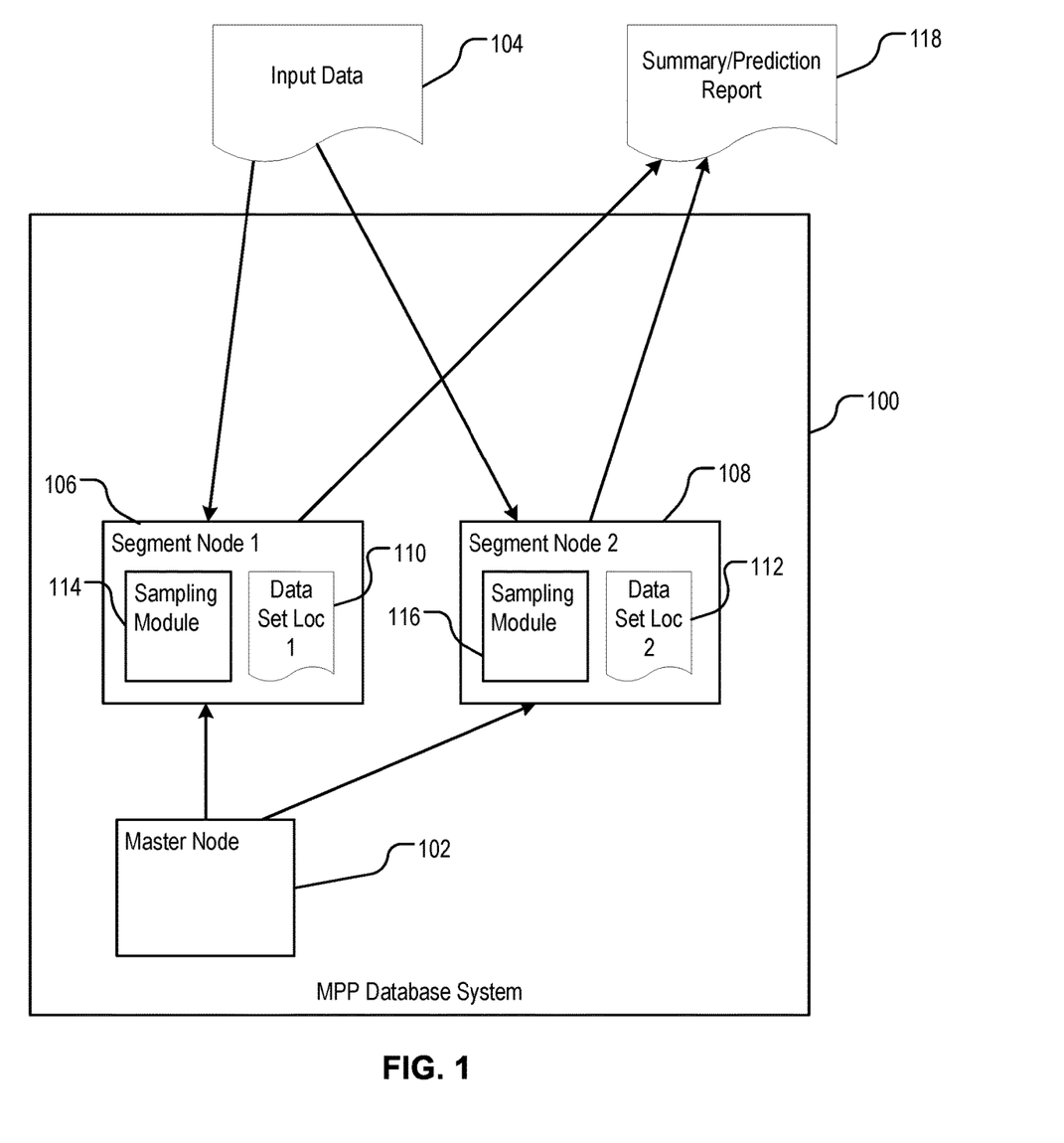
FIG. 1 is a block diagram illustrating example techniques of parallel and distributed Bayesian hierarchical regression using Gibbs sampling.

FIG. 1 is a block diagram illustrating example techniques of parallel and distributed Bayesian hierarchical regression using Gibbs sampling.

A distributed computing system 100 executes parallel and distributed Gibbs sampling. The distributed computing system 100 can be a massively parallel processing (MPP) database system. Examples of the distributed computing system 100 include Pivotal Greenplum Database (GPDB) and Apache HAWQ®.

The distributed computing system 100 includes a master node 102. The master node 102, also referred to as a master server or a master host, is configured to manage the distributed computing system 100. For example, executing user-provided instructions, the master node 102 can distribute the input data 104 to multiple segment nodes. The segment nodes, also referred to as segment servers or segment hosts, are configured to process the data. In the example shown, the segment nodes include segment nodes 106 and 108, each configured to process at least a portion of the input data 104.

In some implementations, the input data 104 includes raw data including multiple explanatory variables and one or more response variables. In some implementations, the input data 104 includes processed data where various forms of joint probability distributions have been calculated for parameters pertaining to multiple explanatory variables and response variables. Each response variable is a variable of interest in data analysis. Response variables can include, for example, number of births per 100,000 people, sales of a widget in number of units, number of Web page visits or store visits, or body fat percentage. Each explanatory variable is a variable that may, or may not, explain a change in the response variable. Example of explanatory variables can include GDP that may affect a birth rate, price that may affect the sales of the widget or store visits, or average daily calorie intake that make affect the body fat percentage. The master node 102 and segment nodes 106 and 108 may not have knowledge on whether a particular explanatory variable is indeed related to a response variable, what relationship the explanatory variable has with the response variable in terms of a statistical formula, or whether two explanatory variables are independent from one another or correlated with one another.

The master node 102 coordinates the distribution of the input data 104 to the segment nodes 106 and 108 based on one or more user-specified table distribution keys. The master node 102 can process queries that set table distribution keys by one or more grouping variables. An example grouping variable is geographic location. The master node 102 can coordinate distribution of the input data 104 by geographic location, for example, by time zone, by state or province, by county, or by postal code. In a scenario where U.S. state is chosen as the distribution key, the master node 102 can coordinate processing of the input data 104 into 50 groups corresponding to 50 states of the United States, and distribute the input data 104 to 50 segment nodes, each corresponding to a respective state.

In some implementations, the system 100 may have more segment nodes than the number of groups. The master node 102 can coordinate distribution of the input data 104 to the segment nodes 106 and 108 by increasing the granularity of the grouping, e.g., by grouping the input data 104 into counties instead of states, or make use of a user-specified second grouping variable to cross with the first grouping variable. For example, when two hundred segment nodes are available in the system 100, the user can select a first grouping variable, e.g., location, grouped by states. The master node 102 designates "state" as a first part of a distribution key. The user can select a second grouping variable, e.g., weather temperature, grouped into four temperature bands, e.g., below 50 degrees, 50-65 degrees, 65-80 degrees, and above 80 degrees. The master node 102 designates the temperature bands as a second part of the distribution key. The master node 102 can process user-specified queries that distribute the input data 104 to the segment nodes based on the distribution key that includes a combination of the states and the temperature bands.

Each of the segment nodes 106 and 108 can perform substeps of Gibbs sampling on respective data subsets 110 and 112. Each of the data subsets 110 and 112 is designated to be processed by a respective segment node 106 or 108. Each of the segment nodes 106 and 108 includes a sampling module 114 and sampling module 116, respectively, for executing the substeps of Gibbs sampling.

The sampling module 114 and sampling module 116 perform operations including drawing samples on each respective segment node in one or more iterations. More iterations can lead to more precise estimates of the variability of each regression parameter. In the first iteration, initial values are set for all parameters of interest—for example, one way to do this is to assign random values for each parameter or leverage parameter estimates from non-hierarchical regression. In the second iteration, each of the sampling module 114 and sampling module 116 draws a sample of parameter(s) of interest for each grouping variable, e.g., regression coefficient of price for a geographic location, by leveraging a fully conditional probability distribution for the parameter(s) of interest and the initial values specified in the first iteration. This is repeated for all parameters of interest for each grouping variable. This process of drawing a sample is parallelized by the grouping variable, in other words, the processing done by sampling module 114 and sampling module 116 is done in parallel. In the third iteration, each of the sampling module 114 and sampling module 116 draws a sample of parameter(s) of interest for each grouping variable by leveraging a fully conditional probability distribution for the parameter(s) of interest and sample values drawn in the second iteration. Sampling module 114 and sampling module 116 draw a fourth, fifth, . . . , Nth sample by repeating this process. As the number of iterations increases, the set of collected samples will converge to the joint posterior probability distribution of all parameters.

In some implementations, the sampling module 114 and sampling module 116 allow each other's data to partially influence its model, thus borrowing strength from other segments of data. For example, in geographic location's case, for a given segment, e.g., a given state, other segment's data, e.g., other states' data, is borrowed to estimate the model for the given segment. This can be enabled by specifying a national-level prior distribution for the state-level coefficients. The resulting samples for the state-level coefficients are partially pooled toward the national-level coefficient.

The process above describes the Markov Chain Monte Carlo (MCMC) property of Gibbs sampling. Once all desired samples have been collected in the sampling chain, it is generally recommended to discard samples from the beginning or "burn-in" period of the chain. Summarizing the sampled values of the parameters can be done by generating a histogram, calculating posterior probability intervals, e.g., a 95% posterior probability interval, and computing metrics like their median or mean. These summaries can be stored in a summary report 118. The system 100 can provide the summary report 118 to one or more data consuming devices, e.g., user computers, for presentation or storage.

Figure 2:
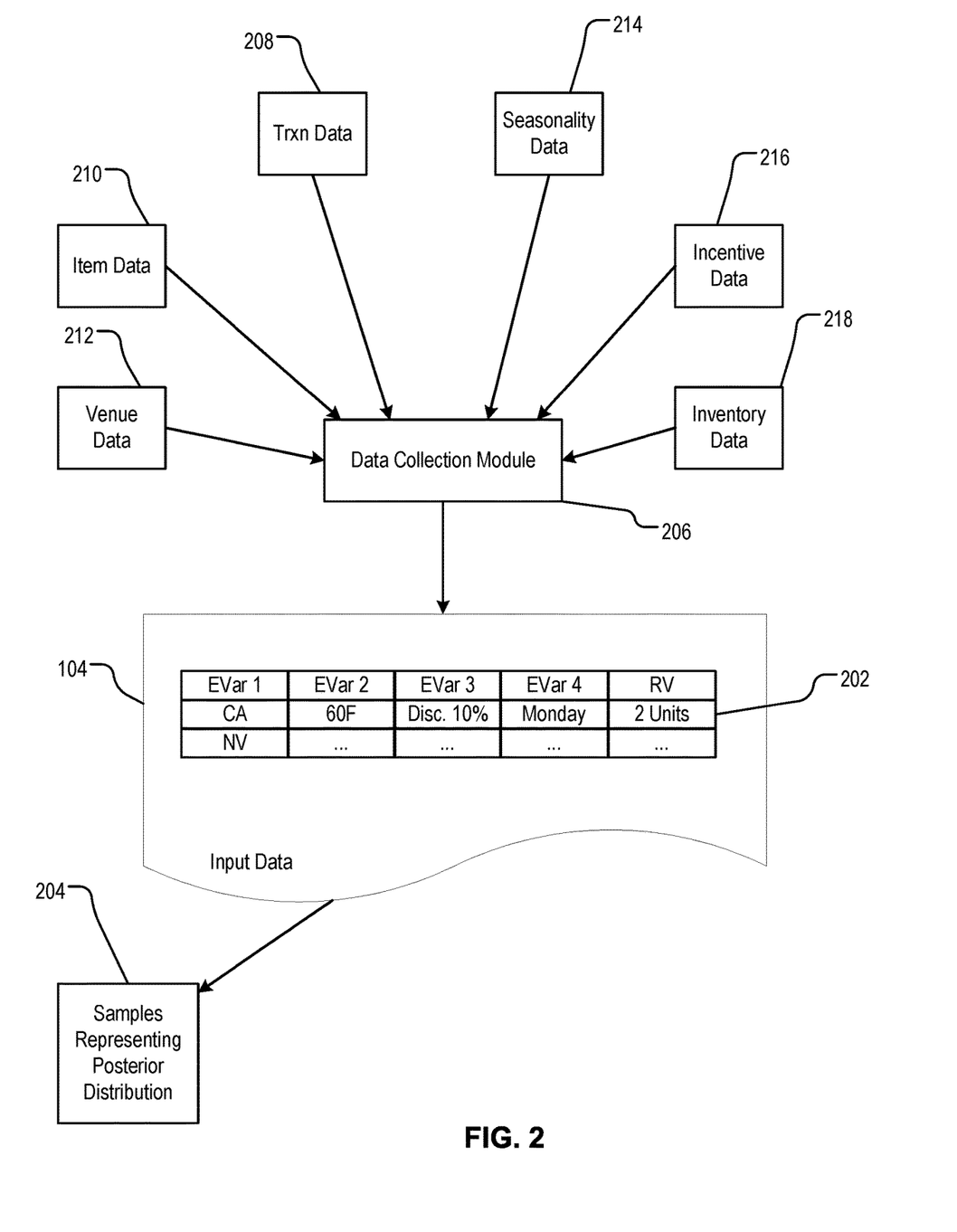
FIG. 2 is a block diagram illustrating composition of input data for parallel and distributed Bayesian hierarchical regression.

FIG. 2 is a block diagram illustrating composition of input data 104 for parallelized and distributed Bayesian hierarchical regression. The input data 104 can include one or more data tables 202. The data tables 202 can include database tables having multiple data fields stored in a distributed parallel processing database system. The data fields can include columns representing the explanatory variables and the response variable. The posterior distribution 204 includes samples of parameters of interest such as regression coefficients. A system, e.g., the distributed computing system 100 of FIG. 1 that includes at least one master node and at least one segment node, or another computer system, can derive the posterior distributions 204 from the data tables 202.

A data collection module 206 can populate the data tables 202 from various sources. The data collection module 206 can include one or more computers coupled to the distributed parallel processing database system storing the one or more data tables 202. The data collection module 206 can populate the data tables 202 with transaction data 208. The transaction data 208 can include data records describing one or more transactions, e.g., a visit of a customer or a patient to a venue, an identifier of the venue, a time of a transaction, an amount of transaction, a number of units of items purchased, among other information.

Additionally or alternatively, the data collection module 206 can populate the data tables 202 with item data 210. Item data 210 can include information on items used in the transaction, for example, item identifier, e.g., an SKU (stock keeping unit); price per unit of services or goods; unit size; or options on an item.

Additionally or alternatively, the data collection module 206 can populate the data tables 202 with venue data 212. Venue data 212 can include information on venues where the transactions take place. For example, venue data can include venue identifiers, e.g., store names; venue locations, e.g., geographic coordinates and addresses including country, state, postal code; venue size; and venue cost.

Additionally or alternatively, the data collection module 206 can populate the data tables 202 with seasonality data 214. Seasonality data 214 can include information on season, weather, or both, that relate to time of a transaction. For example, seasonality data 214 can include outdoor temperature by the hour of various locations, and whether at a given hour the weather is sunny, cloudy, rainy, or snowy.

Additionally or alternatively, the data collection module 206 can populate the data tables 202 with incentive data 216. Incentive data 216 can include information on whether customer incentive programs are available for the transactions, and amount of the incentives. For example, incentive data 216 can include information on discounts or buy-one-get-one-free promotions.

Additionally or alternatively, the data collection module 206 can populate the data tables 202 with inventory data 218. Inventory data 218 can include information on inventory of a particular item of goods or services. For example, inventory data 218 can include information on a date that an item is first available or will be restocked. The system can use this information to gauge pre-order demand. The data collection module 206 may retrieve the various data from various sources.

Figure 3:
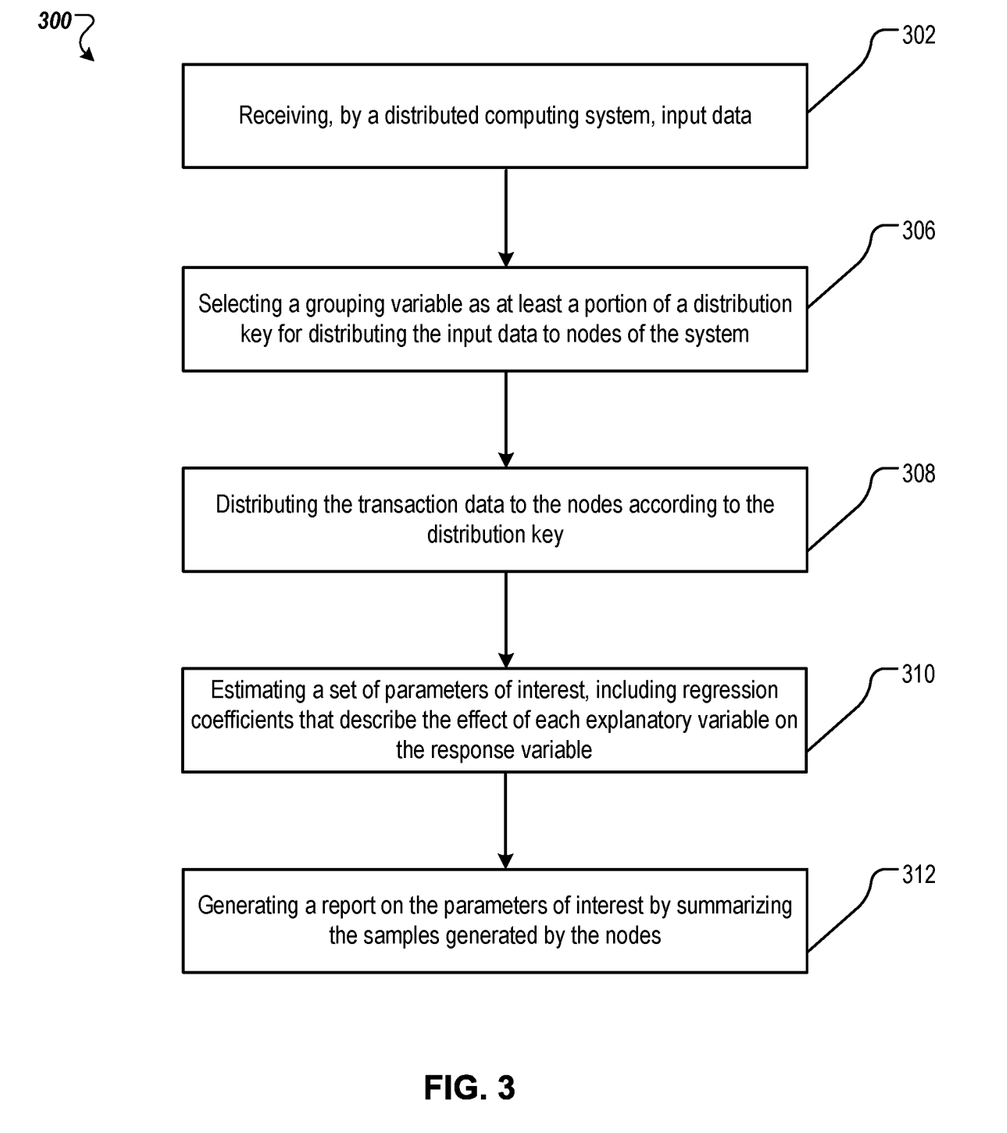
FIG. 3 is a flowchart illustrating an example process of parallel and distributed Bayesian hierarchical regression.

FIG. 3 is a flowchart illustrating an example process 300 of parallel and distributed Bayesian hierarchical regression. The process 300 can be performed by a distributed computing system, e.g., the system 100 of FIG. 1.

The system receives (302) input data. The input data includes at least one result field storing values of a response variable and a plurality of data fields each storing values of a respective explanatory variable affecting the response variable of the result field. The input data can include records of transactions. Each transaction can include an instance of interaction between two or more humans, between one or more humans and one or more computers, or between two or more computers.

The system selects (306) a grouping variable as at least a portion of a distribution key for distributing the input data to nodes of the system. Each of the nodes is a segment node and includes one or more computer processors.

The system distributes (308) the input data and calculations estimating the posterior distribution to the nodes according to the distribution key. For example, the system can distribute the records of transactions whose geographic location are within a first region to a first node, and distribute the records of transactions whose geographic location are within a second region to a second node.

The system estimates (310), using the respective one or more computer processors on each node and in parallel among the nodes, the parameters of interest. This is equivalent to drawing samples from the estimated posterior distribution of the parameters of interest. Operations of estimating the parameters of interest include estimating regression coefficients that describe the respective effect of each explanatory variable on the response variable. In some implementations, the operations include executing a database function of parallel Gibbs sampling without using approximations of Markov Chain Monte Carlo algorithms.

The system generates (312) a report on the parameters of interest by summarizing samples generated by the nodes. The system can provide the report for a report consuming device for storage or for presentation on a display screen or on a printer.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively, or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the user device, which acts as a client. Data generated at the user device, e.g., a result of the user interaction, can be received from the user device at the server.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method comprising:

receiving, by a master node of a distributed computing system, input data including a result field storing values of a response variable and a plurality of data fields each storing values of a respective explanatory variable affecting the response variable of the result field;

determining, by the master node, a grouping variable as at least a portion of a distribution key for distributing a respective portion of the input data to each of a plurality of segment nodes of the distributed computing system, each segment node of the plurality of segment nodes including one or more computer processors;

distributing, by the master node, the respective portion of the input data to each of the plurality of segment nodes according to the distribution key, wherein each respective portion of the input data corresponds to a respective different value or set of values that the grouping variable can take;

generating, by each segment node of the plurality of segment nodes and in parallel among the plurality of segment nodes, a plurality of samples of a posterior distribution of the input data using the portion of the input data distributed to the segment node, the posterior distribution being conditioned on the grouping variable having the value or set of values corresponding to the portion of the input data distributed to the segment node;

determining, using all of the pluralities of samples generated by all of the plurality of segment nodes, a set of prior regression coefficients that identify a respective effect of each explanatory variable on the response variable given any value for the grouping variable;

determining, by each segment node of the plurality of segment nodes and in parallel among the plurality of segment nodes, a respective set of posterior regression coefficients using (i) the plurality of samples generated by the segment node and (ii) the set of prior regression coefficients, the respective set of posterior regression coefficients identifying a respective effect of each explanatory variable on the response variable, given that the grouping variable has the value or set of values corresponding to the portion of the input data distributed to the segment node;

obtaining a new sample identifying (i) a respective value for each explanatory variable and (ii) a particular value for the grouping variable; and processing the new sample using the set of posterior regression coefficients corresponding to the particular value for the grouping variable to generate a predicted value for the response variable, given that the grouping variable has the particular value.

2. The method of claim 1, wherein the input data includes records of transactions, and the grouping variable is selected for parallelizing distribution of the records of the transactions.

3. The method of claim 1, wherein generating, by each segment node of the plurality of segment nodes and in parallel among the plurality of segment nodes, the plurality of samples comprises generating the plurality of samples without using approximations of Markov Chain Monte Carlo algorithms.

4. The method of claim 1, further comprising:
generating a report on the respective set of posterior regression coefficients determined by each of the plurality of segment nodes; and
providing the report to an output device for presentation or storage.

5. The method of claim 1, wherein determining, by a particular segment node of the plurality of segment nodes, the respective set of posterior regression coefficients comprises obtaining samples generated by one or more other segment nodes of the plurality of segment nodes.

6. The method of claim 1, wherein determining, by the master node, the grouping variable comprises obtaining a user input that specifies the grouping variable.

7. One or more non-transitory computer readable storage media storing instructions, which when executed by a distributed computing system, cause the distributed computing system to perform operations comprising:

receiving, by a master node of the distributed computing system, input data including a result field storing values of a response variable and a plurality of data fields each storing values of a respective explanatory variable affecting the response variable of the result field;

determining, by the master node, a grouping variable as at least a portion of a distribution key for distributing a respective portion of the input data to each of a plurality of segment nodes of the distributed computing system, each segment node of the plurality of segment nodes including one or more computer processors;

distributing, by the master node, the respective portion of the input data to each of the plurality of segment nodes according to the distribution key, wherein each respective portion of the input data corresponds to a respective different value or set of values that the grouping variable can take;

generating, by each segment node of the plurality of segment nodes and in parallel among the plurality of segment nodes, a plurality of samples of a posterior distribution of the input data using the portion of the input data distributed to the segment node, the posterior distribution being conditioned on the grouping variable having the value or set of values corresponding to the portion of the input data distributed to the segment node;

determining, using all of the pluralities of samples generated by all of the plurality of segment nodes, a set of prior regression coefficients that identify a respective effect of each explanatory variable on the response variable given any value for the grouping variable;

determining, by each segment node of the plurality of segment nodes and in parallel among the plurality of segment nodes, a respective set of posterior regression coefficients using (i) the plurality of samples generated by the segment node and (ii) the set of prior regression coefficients, the respective set of posterior regression coefficients identifying a respective effect of each explanatory variable on the response variable, given that the grouping variable has the value or set of values corresponding to the portion of the input data distributed to the segment node;

obtaining a new sample identifying (i) a respective value for each explanatory variable and (ii) a particular value for the grouping variable; and processing the new sample using the set of posterior regression coefficients corresponding to the particular value for the grouping variable to generate a predicted value for the response variable, given that the grouping variable has the particular value.

8. The one or more non-transitory computer readable storage media of claim 7, wherein the input data includes records of transactions, and the grouping variable is selected for parallelizing distribution of the records of the transactions.

9. The non-transitory computer readable storage media of claim 7, wherein generating, by each segment node of the plurality of segment nodes and in parallel among the plurality of segment nodes, the plurality of samples comprises generating the plurality of samples without using approximations of Markov Chain Monte Carlo algorithms.

10. The one or more non-transitory computer readable storage media of claim 7, the operations further comprising:
generating a report on the respective set of posterior regression coefficients determined by each of the plurality of segment nodes; and
providing the report to an output device for presentation or storage.

11. The one or more non-transitory computer readable storage media of claim 7, wherein determining, by the master node, the grouping variable comprises obtaining a user input that specifies the grouping variable.

12. The one or more non-transitory computer readable storage media of claim 7, wherein determining, by a particular segment node of the plurality of segment nodes, the respective set of posterior regression coefficients comprises obtaining samples generated by one or more other segment nodes of the plurality of segment nodes.

13. A distributed computing system comprising:
one or more computers and one or more storage devices on which are stored instructions that are operable, when executed by the one or more computers, to cause the one or more computers to perform operations comprising:
receiving, by a master node of the distributed computing system, input data including a result field storing values of a response variable and a plurality of data fields each storing values of a respective explanatory variable affecting the response variable of the result field;

determining, by the master node, a grouping variable as at least a portion of a distribution key for distributing a respective portion of the input data to each of a plurality of segment nodes of the distributed computing system, each segment node of the plurality of segment nodes including one or more computer processors;

distributing, by the master node, the respective portion of the input data to each of the plurality of segment nodes according to the distribution key, wherein each respective portion of the input data corresponds to a respective different value or set of values that the grouping variable can take;

generating, by each segment node of the plurality of segment nodes and in parallel among the plurality of segment nodes, a plurality of samples of a posterior distribution of the input data using the portion of the input data distributed to the segment node, the posterior distribution being conditioned on the grouping variable having the value or set of values corresponding to the portion of the input data distributed to the segment node;

determining, using all of the pluralities of samples generated by all of the plurality of segment nodes, a set of prior regression coefficients that identify a respective effect of each explanatory variable on the response variable given any value for the grouping variable;

determining, by each segment node of the plurality of segment nodes and in parallel among the plurality of segment nodes, a respective set of posterior regression coefficients using (i) the plurality of samples generated by the segment node and (ii) the set of prior regression coefficients, the respective set of posterior regression coefficients identifying a respective effect of each explanatory variable on the response variable, given that the grouping variable has the value or set of values corresponding to the portion of the input data distributed to the segment node;

obtaining a new sample identifying (i) a respective value for each explanatory variable and (ii) a particular value for the grouping variable; and processing the new sample using the set of posterior regression coefficients corresponding to the particular value for the grouping variable to generate a predicted value for the response variable, given that the grouping variable has the particular value.

14. The system of claim 13, wherein the input data includes records of transactions, and the grouping variable is selected for parallelizing distribution of the records of the transactions.

15. The system of claim 13, wherein generating, by each segment node of the plurality of segment nodes and in parallel among the plurality of segment nodes, the plurality of samples comprises generating the plurality of samples without using approximations of Markov Chain Monte Carlo algorithms.

16. The system of claim 13, the operations further comprising:

generating a report on the respective set of posterior regression coefficients determined by each of the plurality of segment nodes; and providing the report to an output device for presentation or storage.

17. The system of claim 13, wherein determining, by a particular segment node of the plurality of segment nodes, the respective set of posterior regression coefficients comprises obtaining samples generated by one or more other segment nodes of the plurality of segment nodes.

18. The system of claim 13, wherein determining, by the master node, the grouping variable comprises obtaining a user input that specifies the grouping variable.

\* \* \* \* \*